Nov. 1, 1960  J. C. DART ET AL  2,958,650
REMOVING CONTAMINANTS FROM CATALYST PARTICLES
Filed July 28, 1955
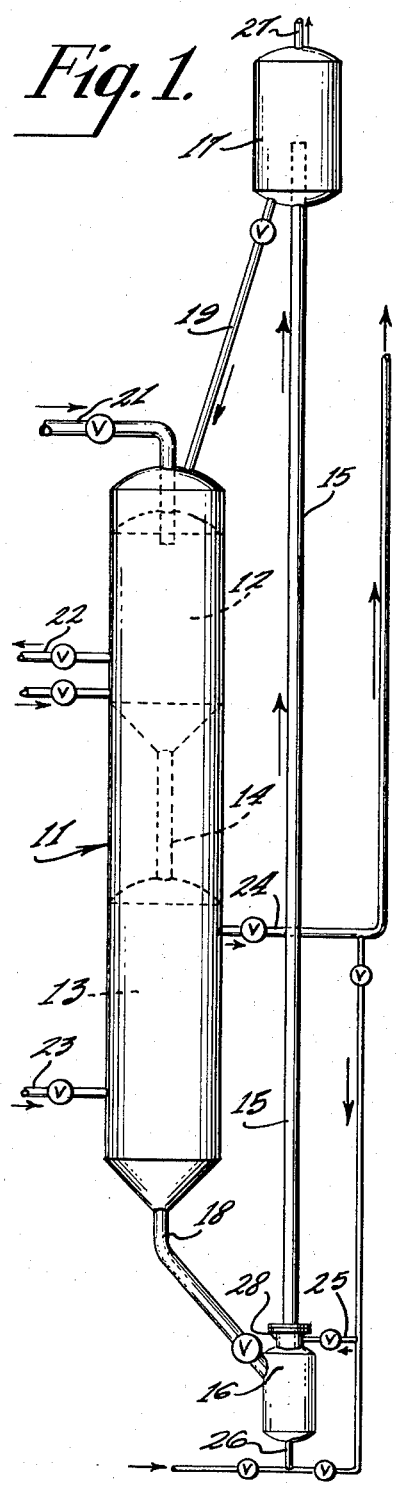
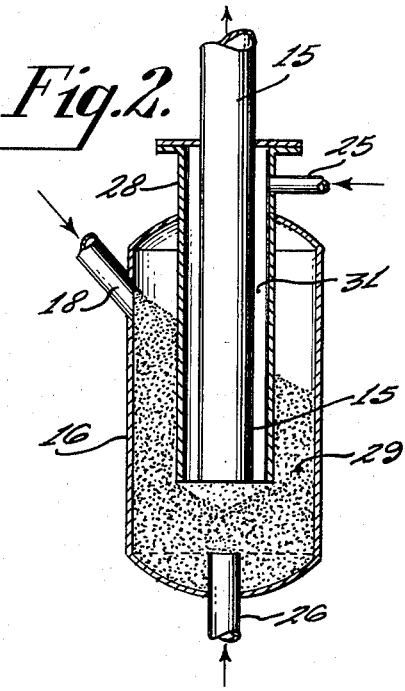
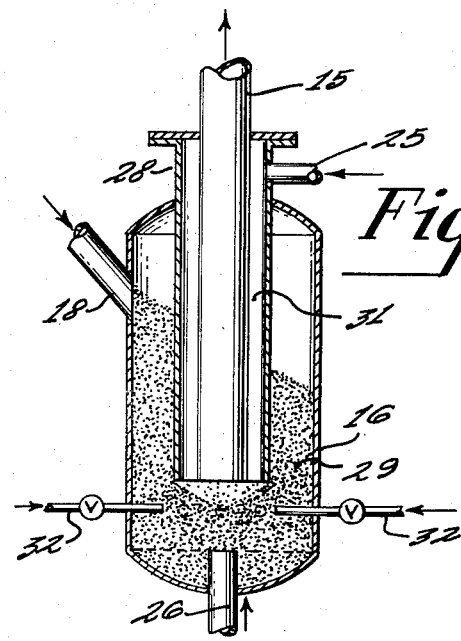
INVENTORS.
Jack C. Dart &
Frederick R. Walser
BY
William Halunder
ATTORNEY.

United States Patent Office 2,958,650
Patented Nov. 1, 1960

2,958,650

REMOVING CONTAMINANTS FROM CATALYST PARTICLES

Jack C. Dart, Moylan, and Frederick R. Walser, Drexel Hill, Pa., assignors to Houdry Process Corporation, Wilmington, Del., a corporation of Delaware Filed July 28, 1955, Ser. No. 525,035

4 Claims. (Cl. 208—174)

This invention relates to a method for selectively removing surface-deposited contaminants from granular particles of catalyst, particularly particles in the size range of about 2 to 13 mm., such as are commonly employed in hydrocarbon conversion systems of the moving-bed type. In such systems the relatively large-size granular catalyst gravitates through hydrocarbon conversion and catalyst regeneration zones in the form of a non-turbulent compact moving bed, as distinguished from systems employing turbulent fluidized masses of relatively small-size catalyst particles in the conversion and regeneration zones.

The invention is particularly concerned with hydrocarbon conversion processes involving the cracking of petroleum residua containing relatively high concentrations of metallic contaminants which are known to be deposited on the surface of the catalyst particles during the cracking reaction and which may cause an adverse distribution of product obtained from the petroleum residua. It is known for example, that nickel and vanadium are particularly troublesome contaminants derived from the cracking of heavy petroleum residua. The invention, however, contemplates the selective removal of other metallic contaminants which may be derived from a particular hydrocarbon stock and which similarly contaminate the catalyst by forming a deposit on the surface of the catalyst particles.

In the operation of a typical petroleum cracking unit wherein compact moving masses of granular catalyst are continuously circulated, the particle-to-particle contact of the catalyst and the contact of catalyst particles with the metallic surfaces of the path-defining members of the circulatory system result in a gradual attrition of the catalyst particles. Such attrition produces within the circulating mass a quantity of extremely small-size particles of catalyst, generally designated as fines. For efficient operation of the process, such fines require either continuous or periodic removal from the circulating mass.

It has been observed that the rate of catalyst attrition in a particular system is normally determined by several factors, some of which are susceptible to such control as will serve to minimize attrition, and others of which are an unavoidable consequence of the friction caused by continuous movement of the catalyst mass through the circulatory system. In those systems wherein a continuous circulation of the catalyst or contact material is maintained by pneumatic elevation of the catalyst from the bottom of its downflow path to the upper end thereof, it has been observed that a certain portion of the total attrition may be attributed to the rapid movement of the catalyst particles within the lift and its associated engaging and disengaging zones. In lift systems employing mechanical means, such as bucket elevators for elevating the catalyst, there is also constant attrition of the catalyst particles, although the regions of maximum attrition may be different in the two systems.

In accordance with the broadest aspects of the present invention it is proposed to effect the removal of surface-deposited contaminants from the catalyst particles by selective and controlled attrition in those portions of the circulatory system wherein such control of attrition may be most readily effected. It is believed that such selective control of attrition is best effected within the lift system, regardless of whether pneumatic or mechanical means are employed for lifting the catalyst particles. As one embodiment of the invention it is contemplated that in those systems which employ a pneumatic lift the surface-deposited metallic contaminants on the catalyst may readily be removed by controlling the operation of the pneumatic lift in such manner that the rate of attrition may be maintained at a level suitable to effect the desired removal of the metallic deposit. In a preferred mode of operation, such removal of deposited metallic contaminants is effected by controlling the conditions determining the rate of catalyst attrition.

For example, in the commercial operation of hydrocarbon conversion units employing a pneumatic lift for maintaining continuous circulation of the catalyst particles, such as the unit or system described in an article "Houdriflow, New Design in Catalytic Cracking" appearing in the January 13, 1949 issue of "The Oil and Gas Journal," it has been noted that the catalyst attrition rate is a direct function of the density of the catalyst in the lift pipe, especially in large-size lift pipes. For example, at catalyst linear velocities of 20 ft./sec. and at catalyst densities of 6#/cu. ft. the catalyst attrition rate was relatively high, while at catalyst linear velocities of 30 to 40 ft./sec. and with catalyst densities of 1 to 2#/cu. ft. the catalyst attrition rate was considerably lower. In accordance with a specific embodiment of the invention, it is proposed that attrition of the catalyst be controlled through suitable control of the velocities and densities maintained within the lift system, so as to produce such controlled attrition of the catalyst particles as will effectively remove substantially only catalyst containing a high proportion of the undesirable metallic contaminants. It is contemplated that such removal will not exceed the amount required to maintain the catalyst particles, insofar as it is possible, in a satisfactory equilibrium condition of effectiveness as a catalyst.

In the cracking of hydrocarbons containing more than about 0.5–1 p.p.m. (parts per million) of nickel and vanadium, it has been observed that the catalyst particles are susceptible to loss of activity and give a less favorable product distribution, which phenomena are commonly referred to as abnormal aging. Such aging is caused, in part, by the deposit of heavy metal contaminants on the surface of the gravitating particles of cracking catalyst. Such contaminants may include not only the aforementioned nickel and vanadium, which are particularly troublesome, but also iron, copper, and other heavy metals which adversely affect the activity and selectivity of the cracking operation. It has been found that catalyst particles containing more than about 200 p.p.m. of deposited contaminants of the type comprising nickel and vanadium are unsuitable as cracking catalysts in conventional cracking units. It has also been observed that the fines resulting from the attrition of catalyst particles contains a concentration of heavy metal contaminants several times greater than the concentration of such contaminants in the catalyst from which the fines were removed. It is for this reason that controlled attrition is proposed as a means for selectively removing the heavy metal particles which are deposited as a surface layer upon the granular catalyst.

In one embodiment of the invention it is contemplated that attrition of the catalyst may be controlled by initially setting conditions of operation for the pneumatic lift so that a maximum catalyst velocity of about 50 ft./sec. and a minimum catalyst velocity in the range of about 15 to 20 ft./sec. will be attained, and by thereafter varying the flow of lift gas to the lift pipe in accordance with the amount of attrition desired. Thus, where a relatively clean feedstock is being charged to the hydrocarbon conversion system, so that only a relatively light deposit of undesirable metal contaminants is formed upon the surface of the catalyst particles, the rate of catalyst attrition may be decreased by increasing the flow of lift gas to the lift pipe.

In another embodiment of the broad invention, it is contemplated that increased attrition of the catalyst particles may be attained through increased turbulence and agitation of the catalyst particles within localized regions of the lift systems. Such increased turbulence may be obtained by introducing lift gas into the engaging zone, that is within the lift engager vessel, in such manner that a high velocity jet of lift gas will be directed against the surface of the relatively slow moving or stagnant body of catalyst which is normally maintained in the bottom of the lift engager. The agitation caused by the impinging jet of gas will serve to materially increase the rate of attrition so that by suitable control of the jet the amount of such attrition may also be controlled. It is further contemplated that the lift gas introduced as a high velocity jet may provide only a portion of the total lift gas required for elevation of the catalyst through the lift pipe, and that means for supplying additional lift gas to the engaging zone of the lift system may be provided. In such case the amount of attrition may be controlled by varying the distribution of lift gas between the two sources of lift gas.

For a fuller understanding of the invention, reference may be had to the following description and claims taken in connection with the accompanying drawing forming a part of this application in which:

Fig. 1 is a diagrammatic view, in elevation, of a hydrocarbon conversion system embodying pneumatic means for maintaining continuous catalyst circulation;

Fig. 2 is a sectional view of the lift engager of Fig. 1 showing the means for engaging the catalyst particles with the lift gas and for transporting the particles at a controlled rate into and through the lift path; and Fig. 3 is a modification of the lift engager of Fig. 2 showing means by which supplementary lift gas may be introduced into the lift engager as a high velocity jet to impinge upon and to agitate the catalyst particles.

Fig. 1 of the drawing diagrammatically illustrates a typical catalytic cracking unit, such as the type referred to in the aforementioned article appearing in The Oil and Gas Journal, which is capable of carrying out the method of the invention. The illustrated unit comprises a vessel 11 containing an upper catalytic cracking zone 12 and a lower regenerating zone 13, which zones are separate and are connected by an internal seal leg conduit 14.

To one side of vessel 11 there is a pneumatic lift system comprising an elongated upright lift pipe 15 extending from a level below the lower end of vessel 11 to an elevated location above the upper end thereof. A lift engager vessel or hopper 16 is provided at the lower end of lift pipe 15 for effecting engagement between the catalyst particles and the lift gas, and a disengager vessel or hopper 17 is provided at the upper end of lift pipe for the purpose of disengaging the catalyst from the lift gas. A draw-off conduit 18 continuously conveys catalyst from the bottom of the regeneration zone 13 into the lift engager 16 and a return conduit 19 conveys disengaged catalyst from the disengager 17 into the upper end of the vessel 11 for subsequent return to the reaction zone 12.

The hydrocarbons forming the reactor charge, which may be vaporous or mixed phase, are introduced through conduit 21 into the upper region of the cracking or reaction zone 12 wherein they flow concurrently through a compact moving bed of the granular catalyst gravitating within the reaction zone. The gaseous reaction products are withdrawn from the lower region of the reaction zone 12 through conduit 22.

After purging the catalyst particles of vaporizable material in known manner at the bottom of the reaction zone, the catalyst particles, now contaminated with a deposit of carbonaceous material and heavy metal contaminants derived as a product of the catalytic cracking reaction, are withdrawn as a compact moving stream through seal leg 14 into the regenerating zone 13. Within zone 13 the particles of catalyst again gravitate as a compact moving bed in the presence of oxygen-containing gas for the purpose of removing by combustion at least a substantial portion of the carbonaceous deposit. The oxygen-containing gas, such as air, is introduced at the bottom of the regenerating zone 13 through conduit 23, and the gaseous products of regeneration are discharged from the upper end of regenerating zone 13 through conduit 24.

Regenerated catalyst is discharged from the bottom of zone 13 and is conveyed as a compact moving stream through conduit 18 into the lift engager 16, wherein the catalyst is deposited directly onto the surface of a compact moving bed of catalyst gravitating around and below the lower end portion of the lift pipe 15, as will hereinafter be more fully described.

Lift gas is introduced into the lift engager 16 through one or more supply conduits, such as 25 and 26, which may be connected to a common source. In the particular system illustrated, the lift gas may comprise any inert gaseous material, such as flue gas, steam, etc.

The lift gas engages the catalyst within the lift engager and conveys it at controlled velocity and in controlled amount upwardly into and through the lift pipe 15 to the disengager 17, where the mixture of catalyst and lift gas discharges as a fountain-like stream from the upper end of the lift pipe. Sufficient vertical height is provided between the upper end of the lift pipe and the top of the disengager 17 so that the catalyst particles may be fully decelerated by force of gravity and permitted to fall freely to the bottom of the disengager vessel. The lift gas continues upward through the vessel 17 and is discharged from the upper end thereof through conduit 27.

In known manner, inert seal gas may be introduced as needed at various locations within the system, such as within draw-off conduit 18, seal leg 14, and return conduit 17 in order that there may be no undesirable migration of gaseous material between the zones which they connect.

The circulation of catalyst through the circulatory system is controlled by the introduction, with regard to manner and amount, of lift gas into the engager 16 from conduits 25 and 26.

The normal operation of a catalytic cracking unit of the type described is attended by a gradual attrition of the catalyst particles as a result of both particle-to-particle contact and contact between the particles and the internal surfaces of equipment confining the movement of catalyst through the circulatory system. While it is not possible to completely eliminate such attrition, it has been found that such systems may be commercially operated to advantage with a catalyst make-up, to replace removed fines, of between ½ to 1 ton of fresh catalyst per day for each 100 tons of circulation per hour.

Insofar as operation alone is concerned, the system will tolerate an amount of attrition much greater (such as about 5–10 times greater) than the above-mentioned advantageously low amount. Replacement cost is the principal consideration in dictating the need for operation with low attrition.

Where the catalyst becomes excessively contaminated with material that is not readily removed in the usual regeneration treatment, loss of activity may dictate early replacement of such catalyst. Such is the case where the surface of the catalyst is contaminated with a relatively large deposit of heavy metals. The lower yields and adverse product distribution resulting from such loss of catalytic activity are such that the contaminated catalyst must be continuously or periodically replaced, or steps must be taken to reactivate the catalyst by removing the surface contaminants, such as by attrition or abrasion, as herein proposed.

With knowledge of the factors primarily responsible for attrition in the circulatory system, it is proposed to control such factors so as to effect a selective attrition of the catalyst suitable to remove such surface contaminants.

In one form of the invention it is contemplated that such control may be advantageously applied in the lift portion of the system. For a given catalyst circulation rate the attrition may be increased by decreasing the average particle velocity, with resultant increase in particle concentration or density. In a lift pipe of uniform diameter the maximum average particle velocity is attained at the discharge end of the pipe. Where decelerating means is provided at the upper end portion of the lift, such as, a tapered pipe section or a cylindrical pipe section of greater diameter than that of the main lift, the maximum average particle velocity is attained at the entrance to the decelerating section.

In order to effect the desired control of catalyst flow within the lift, the lift gas flowing into the catalyst engaging zone at the bottom of the lift is controlled as to amount, and mode of introduction. Among the methods suitable for effecting such process control are those disclosed in U.S. Patents Nos. 2,662,796—Shabaker, and 2,699,363—Weinrich. A suitable method for controlling solids flow at the discharge end of the lift path is disclosed in Patent No. 2,697,640—Newman.

Another method, which may advantageously be employed in conjunction with the aforementioned process control, for accomplishing the same result is to employ one or more lift paths of relatively large diameter, so that the inherent internal recycling which occurs during normal operation will result in a relatively high rate of catalyst attrition. Such method would be especially desirable, for example, in the processing of crudes having a high metals content. To effect such purpose in the manner described it is contemplated that lift pipes having a diameter in excess of 20 inches would be most suitable, since it has been found that attrition rates show a particularly marked increase when the lift pipe diameter exceeds 20 inches.

In connection with the known use of means for decelerating catalyst in the upper region of the lift path just prior to discharge into the disengaging vessel, there are presented several other possibilities for effecting the desired increase in attrition. When the upper end of the lift path is to be gradually tapered or expanded to provide a gradual increase in flow area, with consequent reduction in gas velocity, it is possible to either initially set the angle of taper at such value as to effect substantial recycling in the decelerator section, or to control the flow of gas into the lift engager in a manner to effect controlled recycling in the decelerator section.

When the discharge velocity is to be controlled in the manner set forth in the aforementioned patent to Newman—2,697,640, involving the use at the upper end of the lift of a straight pipe section having a diameter greater than the diameter of the main lift pipe, with introduction of secondary lift gas at the base of the decelerating section, the rate of attrition may be controlled through control of such secondary gas. Decreasing the flow of secondary gas to the base of the decelerating section will increase attrition of the catalyst.

Still another method for effecting control of attrition in the disengager portion of a pneumatic lift is to discharge the lift gas and catalyst into a centrifugal collector, the catalyst being admitted tangentially within the collecting zone and whirling around the peripheral region in a spiral path until its momentum is spent. The spiral path could be provided with an abrasive surface in order to increase the attrition.

With reference again to the engaging zone of the pneumatic lift system, the rate of attrition may be increased also by introducing the lift gas at one or more locations within the lift engager in the form of jets which may be so arranged as to cause substantial turbulence of the catalyst particles as they are picked up by the gas stream and carried into the lift path. Such turbulence causes rapid attrition by reason of the particle-to-particle contact and the contact between the catalyst particles and the internal surfaces of the lift engager vessel and the inlet to the lift path.

Still another possible method by which attrition may be increased consists in handling the material in localized areas of the kiln in such manner that the particles are caused to boil, thus increasing the particle-to-particle frictional contact. This is best accomplished in the regions of air introduction, the air being introduced at such velocity as to achieve the desired boiling without exceeding the normal limits of the system to such extent as to cause a hold-up of the gravitating mass of catalyst.

It is to be understood that the invention in its broadest sense is not limited to any specific means for effecting selective and controlled attrition, nor to any particular region of the system as a whole wherein such controlled attrition may be effected. The invention contemplates a method of operation which will not subject the catalyst particles to such severe handling as to fracture the particles by crushing or impact or to attrite the particles in such uncontrolled fashion as to not only remove the metallic surface contaminants on the catalyst, but also substantial portions of sound or reconditioned catalyst. While apparatus may be designed and initially constructed so as to embody a manner of operation which is set to produce a desired increased rate of attrition, such arrangement would provide merely a mechanical control of attrition rate and would not be readily susceptible to adjustment in accordance with changing conditions. It is considered, therefore, that those of the foregoing suggested modes of operation which provide a process control which is variable at will may be most suitable for application to existing installations. Of these process control methods, the one which appears to be most readily applicable and easiest to control is that which involves an adjustment or control of air flow to the lift engaging zone so as to vary the rate of attrition by adjusting the particle concentration or the maximum particle velocity.

The extent of selective attrition required to remove the metallic contaminants from the catalyst is relatively small, since the contaminants are concentrated in the peripheral region of the catalyst pellet. Such peripheral concentration has been clearly demonstrated by grinding contaminated clay pellets, initially containing 450 p.p.m. (parts per million) of nickel, in a specially designed grinding apparatus. The following table shows the results of such grinding:

Table I

| Reduction, Wt. Percent | Nickel Concentration on Core, p.p.m. | Nickel Concentration on Fines | Selectivity Factor [1] |
|---|---|---|---|
| 0 | 450 | | |
| 1.4 | 380 | 5,380 | 12.0 |
| 3.8 | 358 | 2,780 | 6.1 |
| 11.8 | 289 | 1,729 | 3.8 |
| 24.5 | 220 | 1,160 | 2.6 |

[1] Selectivity factor = $\dfrac{\text{p.p.m. metal in fines}}{\text{p.p.m. metal in whole pellets}}$ The data clearly show the definite and sharp decrease in contaminant concentration toward the interior of the pellet. The metals concentration in the first 1.4% of the catalyst removed by peripheral grinding is 11.9 times as great as the concentration of metals on the whole pellet before grinding. It is obvious, therefore, that selective removal of contaminants through controlled attrition could be 12.0 times as effective for controlling contaminant build-up as removing the whole contaminated pellet. While the contaminant concentration in increments less than 1.0 wt. percent was not determined experimentally, extrapolation from the available data indicates that the selectivity factor would certainly be substantially greater than the highest value indicated in Table I, possibly being of a value of 60 to 100 for a weight percent reduction of about 0.03.

From a material balance obtained in a typical operation, the equation relating the equilibrium metals content of the catalyst with the metals content of the charge stock may be derived; thus, in terms of parts per million (p.p.m.):

Metals in oil charge plus metals in make-up catalyst equals metals in catalyst withdrawal plus metals vaporized in reactor and kiln.

Assuming the make-up catalyst to be free of harmful metallic contaminants and the metallic contaminants in the oil charge to be essentially non-volatile, the following equation is obtained:

$$X = \frac{M.O}{C.S} = \frac{M}{c.S}$$

where:

X = equilibrium metals content of catalyst (p.p.m.)
M = non-volatile metals content of oil charge (p.p.m.)
O = oil charge rate (lbs./hr.)
C = catalyst make-up rate (lbs./hr.)
c = catalyst make-up rate (wt. fraction of oil charge)
S = attrition selectivity factor The foregoing equation was applied to the data obtained from a 34-day equilibrium operating period of a commercial unit for catalytically cracking heavy residual charge stock, with the following results:

EXAMPLE I

| | |
|---|---:|
| Operating period—days | 34 |
| Oil charge rate: | |
|   B.P.D. | 6,380 |
|   Lbs./hr. (O) | 84,000 |
| Metals content of oil charge (M): | |
|   Nickel | 4.2 |
|   Vanadium | 6.4 |
| Catalyst make-up rate: | |
|   Tons/day | 4.0 |
|   Lbs./hr. (C) | 333 |
|   Wt. fraction of oil charge (c) | 0.004 |
| Equilibrium metals content—p.p.m. (X): | |
|   Nickel | 310 |
|   Vanadium | 380 |
| Attrition selectivity factor (S): | |
|   Nickel | 3.4 |
|   Vanadium | 4.2 |

In the operation of the commercial unit the equilibrium metals content was approximately one fourth the value that would have been attained without selective attrition. The attrition selectivity factor was appreciably less than the attrition selectivity factor that was obtained in the aforementioned grinding apparatus referred to in connection with Table I. This may be attributed to the fact that in the commercial unit a large share of the attrition was caused by pellet breakage, and only a relatively minor share was caused by abrasive removal of peripheral elements of the pellet. Since the charge stock of the example contained only 4.2 p.p.m. of nickel and 6.4 p.p.m. of vanadium, and since no deleterious effect of the equilibrium metals content was found, the relatively low attrition selectivity factor was quite satisfactory. It is contemplated, however, that for charge stocks having a considerably higher metals content a substantially higher attrition selectivity factor may be desirable or necessary. For example, in a Garland crude having a nickel and vanadium content of 44 and 74 p.p.m., respectively, the equilibrium metals content of the catalyst would calculate by the aforementioned equation to be 3,270 p.p.m. of nickel and 4,400 p.p.m. of vanadium. Or, for Boscan crude having a nickel and vanadium content of 107 and 1,148 p.p.m., respectively, the equilibrium metals content of the catalyst would similarly calculate to be 7,950 p.p.m. of nickel and 69,000 p.p.m. of vanadium.

Although contaminant concentrations in the catalyst of up to 1000–1500 p.p.m. have not generally been considered to have a deleterious effect in heavy stock processing, it is expected that crudes containing substantially higher concentrations of metals will have a deleterious effect. In such case, it is the purpose of the present invention to effect within the commercial unit a selective attrition of the catalyst most nearly approaching the selective attrition obtained through laboratory grinding.

Using the data obtained from the aforementioned commercial unit for cracking heavy residual stock, the following tabulation shows the calculated equilibrium metals content of catalysts employed in the conversion of both Garland and Boscan crudes. Catalyst make-up rates between 2.5 and 10 tons/day, and catalyst attrition selectivity factors between 4 and 50 are assumed.

Table II

EQUILIBRIUM METALS CONTENT OF CATALYST IN PROCESSING OF OILS HAVING HIGH METALS CONTAMINATION

| Contaminant | Ni | V | Ni | V |
|---|---:|---:|---:|---:|
| Metals Content of Oil, p.p.m. | 44 | 74 | 107 | 1,148 |
| Make-up=2.5 t.p.d. (0.25 Wt. Percent) Selectivity= | | | | |
|   4 | 4,440 | 7,460 | 10,800 | 115,800 |
|   10 | 1,780 | 3,000 | 4,330 | 46,500 |
|   50 | 356 | 600 | 866 | 9,300 |
| Make-up=5 t.p.d. (0.50 Wt. Percent) Selectivity= | | | | |
|   4 | 2,220 | 3,730 | 5,040 | 57,900 |
|   10 | 890 | 1,500 | 2,165 | 23,250 |
|   50 | 178 | 300 | 434 | 4,650 |
| Make-up=10 t.p.d. (1.00 Wt. Percent) Selectivity= | | | | |
|   4 | 1,110 | 1,865 | 2,520 | 28,950 |
|   10 | 445 | 750 | 1,083 | 12,125 |
|   50 | 90 | 150 | 216 | 2,326 |

With reference to the method for effecting selective attrition by controlling the introduction of lift gas to the lift engager, it is contemplated that when the metals content of the oil charge stock is low the lift may be operated normally. In certain known commercial practice such normal operation would involve catalyst particle velocities in the range of about 20–40 ft./sec. and densities or particle concentrations, within the confined lift path in the order of about 0.4–1.0 lbs./cu. ft.

At such relatively high velocities and relatively low densities the catalyst pellets are so widely spaced or distributed within the conveying gas stream that there is only slight particle-to-particle contact between the catalyst pellets, and consequently only normal attrition occurs. For example, with an oil charge stock containing a total of 10 p.p.m. of nickel and vanadium, and assuming a normal attrition selectivity factor of 4 and a weight fraction make-up of 0.0025, by application of the aforementioned equation or formula the equilibrium metals content of the catalyst is readily calculated to be 1000 p.p.m.

Assuming then a desire to charge an oil stock having a relatively high metals content, such as Garland reduced crude having a total nickel plus vanadium content of 118 p.p.m., by application of the formula and employing a normal attrition selectivity factor and weight fraction make-up as immediately above the equilibrium metals content would be 11,800 p.p.m. Since it would take a relatively long period of time for the metals content of the catalyst to reach equilibrium, no immediate change in lift operation would be made. As the metals content of the catalyst increased, however, the conversion and yields would be watched closely. If then the coke yield started to increase, or gasoline or No. 2 fuel oil started to decrease, the contaminant level could be stabilized or reduced by increasing attrition in the lift. This is accomplished by decreasing the flow of lift gas to the lift. The catalyst density or particle concentration in the lift would consequently increase, assuming the catalyst circulation rate to remain constant. Increased density in the lift would cause the catalyst particles to have more extensive abrasive contact with each other and with the wall surfaces of the lift path. The resultant grinding down of the catalyst would effect a substantial increase in abrasive attrition, without significant increase in breakage attrition. Hence the attrition selectivity factor would increase.

Assuming that the attrition is doubled and that the incremental attrition occurs at an attrition selectivity factor of 60, the average attrition selectivity factor would be 0.5×4 plus 0.5×60, or 32. For this operation the equilibrium metals content would calculate by the formula to be 737 p.p.m. instead of 11,800 p.p.m. Such reduction of the equilibrium metals content is sufficient to keep the metals content of the catalyst in a range known to produce no significant deleterious effects on the conversion.

The means for controlling such attrition in the lift should preferably embrace lift velocities from approximately 3 ft./sec. up to about 40 ft./sec., the exact practicable minimum velocity being a function of catalyst and gas properties.

In Figs. 2 and 3 of the drawing the lift engager vessel of Fig. 1 is shown in greater detail. The lower end portion of lift pipe 15 is extended into the engager vessel or lower lift hopper 16 and terminates at a lower level therein. A sleeve member 28 concentrically surrounds the lower portion of lift pipe 15 and extends therewith into the lift engager 16. The lower ends of the lift pipe and the sleeve member are shown for the purpose of diagrammatic illustration as being at a common level within the engager. It is to be understood, however, that the lower end of the sleeve may be located at a level a short distance above or below the bottom of the lift pipe.

Catalyst withdrawn from the kiln is introduced as a continuous compact moving stream from conduit 18 into the hopper 16 wherein the catalyst is deposited directly onto the surface of a compact moving bed 29 of catalyst descending about the lower portion of the sleeve 28. The catalyst in known manner, flows inwardly beneath the lower ends of the lift pipe and the sleeve to form an exposed surface of solids inclined at the angle of repose, so that the bottom of bed 29 tends to be of continuous circular cross section.

Lift gas in primary or major amount is introduced through conduit 25 into the annular space 31 formed between the lift pipe 15 and the sleeve member 28. The lift gas discharges from the space 31 as a downwardly-directed annular stream which picks up the inwardly flowing catalyst particles and conveys them into and upwardly through the lift pipe 15.

Lift gas in secondary or minor amount is introduced through conduit 26 into the bottom region of the bed 29 and diffuses upwardly through the mass to facilitate its movement toward the lift inlet. Once the flow of primary lift gas is set, the flow of secondary gas may be controlled to determine the rate of catalyst flow through the lift and, hence, the rate of catalyst circulation through the system.

Conditions of catalyst flow within the lift are determined by selective control of the proportions of the total lift gas supplied through each conduit 25 and 26. It is contemplated that either the flow of primary lift gas may be maintained constant while the flow of secondary gas is varied, or the total lift gas flow may be held constant while the proportionate flow between primary and secondary conduits 25 and 26 is varied. The valve arrangement of Fig. 1 is adequate for either procedure.

In the modification illustrated in Fig. 3 a plurality of jets 32, preferably uniformly distributed about the axis of the lift pipe, are arranged to discharge high velocity streams of gas in such manner as to agitate the catalyst particles, thereby increasing the particle-to-particle frictional contact. It is to be understood that the invention in its broadest aspects is not limited to the illustrated disposition of jets. Any distribution of jets within the lift engager and any direction of jet discharge which will suitably agitate the catalyst particles to achieve the desired result may be employed.

With respect to the aforementioned method of the invention which embodies the concept of inducing substantial boiling of the catalyst particles in the air introduction region of the kiln, illustration by way of drawing has not been considered necessary for an understanding of the invention. Boiling of catalyst within the kiln may be accomplished by increasing the air velocities in the catalyst-air engaging zones of the kiln, such as in the channel assemblies for regeneration air introduction shown in the article entitled "New Houdriflow Installations Employ Modified Design" appearing in the Process Section of the September 1950 issue of "Petroleum Refiner." The article discloses the air inlet channel arrangement for several types of moving-bed catalytic cracking units. Although the increased air velocities at the point of engagement between the air and the catalyst may be achieved by increasing the flow of air, it is contemplated that where any increase in air input would be detrimental to the process such velocity increase may be effected by flow restriction incorporated in the channel assembly.

From the foregoing it is apparent that selective attrition in accordance with the method of the invention may be accomplished in various ways and in any of several portions of the circulatory system the most suitable method for any particular system being a matter for individual determination.

While for purposes of illustration the invention has been particularly described in connection with the catalytic cracking of hydrocarbons, it will be understood by those skilled in the art that the invention is applicable to other treating processes involving the circulation of granular contact material in general, for example refractory granular material of the type employed in pebble heaters.

Thus, the invention applies to processes employing any type of granular contact material which during the contact period in the presence of reactants becomes contaminated with certain reaction products susceptible of removal by attrition.

What is claimed is:
1. In a continuous moving-bed process for the catalytic conversion of petroleum residua in the presence of a circulating mass of granular catalyst, resulting in the deposition upon said catalyst of metallic contaminants normally not removable by combustion during regeneration, in which process said contaminated particles are maintained as a compact moving bed within a lift engaging zone and are conveyed by lift gas introduced therein to and through a vertical confined lift path having its open lower end submerged within said bed, the method for removing said metallic contaminants from the surface of the catalyst particles which comprises: introducing a small minor amount of additional gaseous material as a plurality of high-velocity jets into compactly gravitating regions of said bed so as to cause sub- stantial local turbulence and agitation of said gravitating catalyst particles as they move toward the region of engagement with said lift gas, and controlling the quantity of additional gaseous material in said jets, whereby the particle-to-particle grinding which is conducive to high attrition of said particles removes by abrasion the desired amount of said contaminants.

2. The method as in claim 1 in which said streams of additional gaseous material are jetted into the compactly moving portion of said bed at a level below the lower end of said confined lift path and at separate, uniformly-distributed locations along a circle concentrically surrounding the extended lower end thereof.

3. In a pneumatic lift for elevating granular solids in a hydrocarbon conversion system, comprising a lift pipe, a lift engager containing the lower end portion of the compactly moving portion of said lift pipe and being adapted to maintain a continuous flow of said solids as a compact moving bed around and beneath said lower end portion, and means for introducing lift gas into said engager in a total amount sufficient to convey said solids upwardly into and through said lift pipe, the combination therewith of a plurality of gas jets independently supplied with additional gaseous material, said jets being distributed about the extended lower end of said lift pipe and being adapted to introduce relatively minor amounts of additional gas at high velocity into localized areas of said bed so as to agitate the solids within said areas and effect substantial particle-to-particle frictional contact.

4. Apparatus as in claim 3 in which said plurality of gas jets are arranged to discharge at a common level and along radial lines toward the extended axis of said lift pipe.

References Cited in the file of this patent

UNITED STATES PATENTS

| | | |
|---|---|---|
| 2,598,309 | Say et al. | May 27, 1952 |
| 2,651,600 | Taff et al. | Sept. 8, 1953 |
| 2,684,929 | Schutte | July 27, 1954 |
| 2,723,180 | Celani | Nov. 8, 1955 |
| 2,770,584 | Ray et al. | Nov. 13, 1956 |
| 2,795,533 | Drew | June 11, 1957 |

UNITED STATES PATENT OFFICE
CERTIFICATE OF CORRECTION

November 1, 1960

Patent No. 2,958,650

Jack C. Dart et al.

It is hereby certified that error appears in the above numbered patent requiring correction and that the said Letters Patent should read as corrected below.

Column 1, line 17, for "af" read -- of --; column 11, lines 16 and 17, strike out "the compactly moving portion of" and insert the same after "of", second occurrence, in line 5, column 12.

Signed and sealed this 19th day of September 1961.

(SEAL)
Attest:

ERNEST W. SWIDER
Attesting Officer

DAVID L. LADD
Commissioner of Pate
USCOMM